(12) United States Patent
Garneau

(10) Patent No.: US 7,547,064 B2
(45) Date of Patent: Jun. 16, 2009

(54) VENTILATED SADDLE FOR SPORTING EQUIPMENT

(75) Inventor: Louis Garneau, Saint-Augustin-de-Desmaures (CA)

(73) Assignee: Louis Garneau Sports Inc., Saint-Augustin-de-Desmaures (Québec)

( * ) Notice: Subject to any disclaimer, the term of this patent is extended or adjusted under 35 U.S.C. 154(b) by 398 days.

(21) Appl. No.: 11/438,311

(22) Filed: May 23, 2006

(65) Prior Publication Data

US 2007/0273184 A1 Nov. 29, 2007

(51) Int. Cl.
*B62J 1/00* (2006.01)

(52) U.S. Cl. .............................. 297/195.1; 297/452.46
(58) Field of Classification Search ............. 297/195.1, 297/201, 202, 214, 215.16, 452.46, 452.47
See application file for complete search history.

(56) References Cited

U.S. PATENT DOCUMENTS

| | | | | |
|---|---|---|---|---|
| 581,464 | A | * | 4/1897 | Hollenbeck ................ 297/202 |
| 654,720 | A | * | 7/1900 | Englebert ................... 297/202 |
| 4,451,083 | A | | 5/1984 | Marchello |
| 5,203,607 | A | * | 4/1993 | Landi ......................... 297/214 |
| 5,356,205 | A | * | 10/1994 | Calvert et al. .......... 297/452.41 |
| 6,322,139 | B1 | | 11/2001 | Chuang |
| 6,450,572 | B1 | | 9/2002 | Kuipers |
| 6,629,728 | B2 | | 10/2003 | Losio et al. |
| 6,739,656 | B2 | * | 5/2004 | Yu ........................ 297/215.16 |
| 6,976,736 | B2 | * | 12/2005 | Yu ........................ 297/215.16 |
| 2003/0025363 | A1 | | 2/2003 | Gaggiola |
| 2003/0067195 | A1 | | 4/2003 | Sylvester |
| 2004/0004374 | A1 | | 1/2004 | Garland et al. |

FOREIGN PATENT DOCUMENTS

| | | |
|---|---|---|
| EP | 0353201 | 1/1990 |
| TW | 553128 Y * | 9/2003 |

OTHER PUBLICATIONS

*Saddles*, Aug. 3, 2005, Road Cycling UK, www.roadcyclinguk.com/news/article.asp?SP=&v=1&UAN=518.
Tioga 2005 Catalogue, www.tiogausa.com, p. 7.
San Marco Rever Saddle, www.cyclingnews.com/tech.php?id=tech/2005/reviews/selle_san_marco_rever.

* cited by examiner

*Primary Examiner*—David Dunn
*Assistant Examiner*—Tania Abraham
(74) *Attorney, Agent, or Firm*—Ogilvy Renault, LLP

(57) ABSTRACT

A ventilated saddle includes a seat plate having an upper face and a plurality of seat plate vents extending therethrough; and a covering member having a plurality of covering member vents extending therethrough. The covering member is mountable to the upper face of the seat plate in a single predetermined position relative thereto and in which the seat plate vents are in register with the covering member vents to provide continuous aeration paths throughout the ventilated saddle.

8 Claims, 7 Drawing Sheets

FIG_1

FIG_2

FIG_3

FIG_4

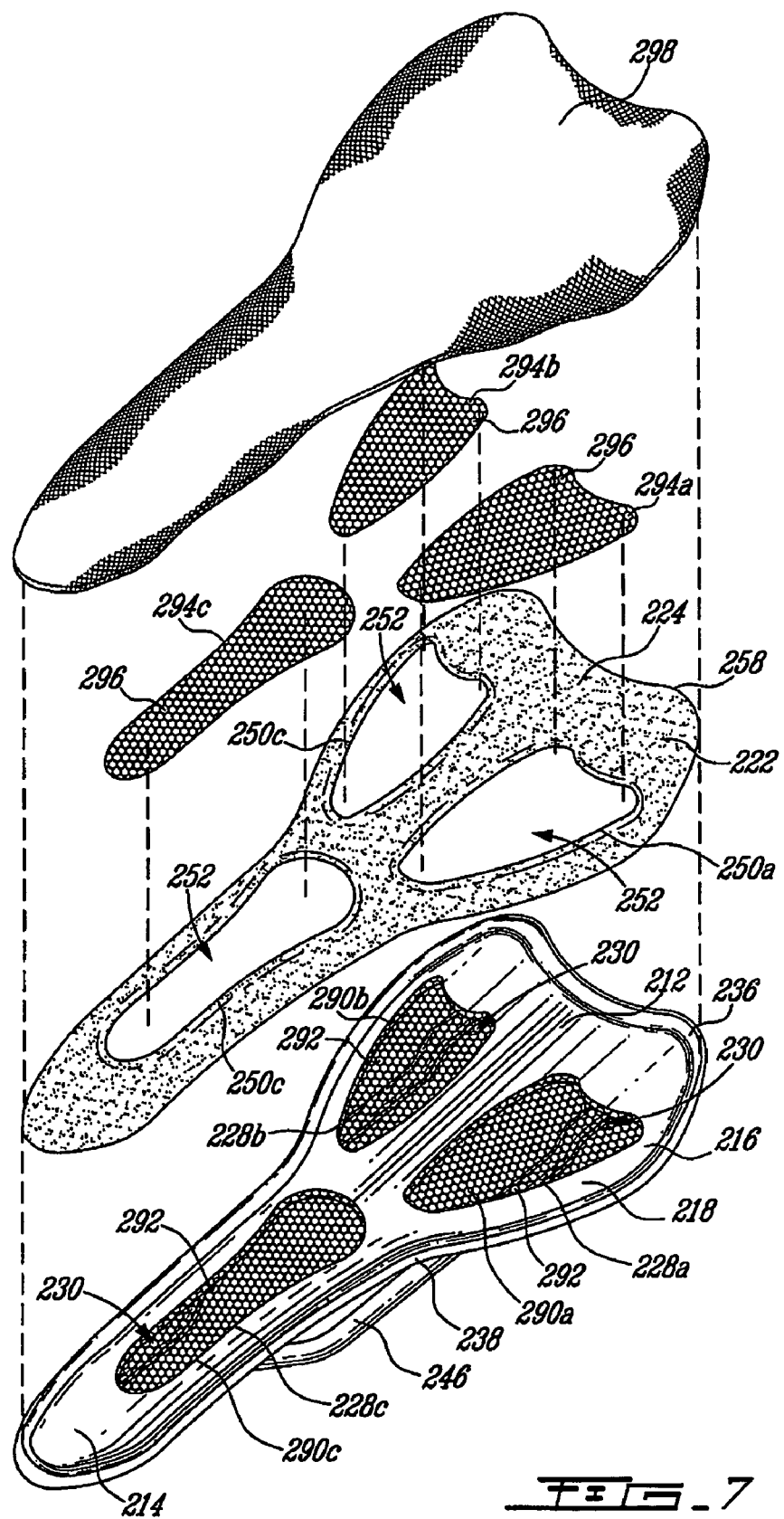

VENTILATED SADDLE FOR SPORTING EQUIPMENT

BACKGROUND OF THE INVENTION

1) Field of the Invention

The invention relates to saddles for sporting equipment and, more particularly, to a saddle with ventilation properties. The invention also relates to a method for manufacturing a saddle with ventilation properties.

2) Description of the Prior Art

Saddles are connected to the frame of a sporting equipment, such as a bicycle, to support the weight of a user. Typically, the front part of the saddle has a narrow profile in order not to interfere with the movement of the user's legs while exercising. The back part of the saddle is wider than the front part thereof for providing additional support. The saddle usually includes a cushioning member or a covering member, such as a leather layer, on its upper surface to provide comfortable support for the user.

While exercising, sportsmen/sportswomen suffer from high heat that is generated at the buttocks and inner thighs due to repeated frictional movements with the saddle. The sportsman/sportswoman sweats and thus feels uncomfortable and sometimes has rashes. The high heat can also cause infertility for sportsmen and can lead to health problems.

The cushioning member, provided for increased comfort, typically does not allow the escape of moisture located between the buttocks and inner thighs and the saddle.

There is thus a need for a saddle combining both qualities, i.e. the comfort provided by the cushioning member or the covering member and an adequate ventilation between the riders buttocks and inner thighs and the saddle.

Furthermore, the ventilation needs vary in accordance with the weather. In colder temperature, the sportsman/sportswoman requires less ventilation to be comfortable. In warmer temperature, the body generates more heat and moisture and more ventilation is required to the sportsman/sportswoman to be comfortable.

BRIEF SUMMARY

It is therefore an aim of the present invention to address the above mentioned issues.

According to an aspect, there is provided a ventilated saddle, which comprises: a seat plate having a rear end and a front nose an upper face, and three seat plate vents extending therethrough and each receiving a corresponding seat plate aeration grid, including a first seat plate vent and a second seat plate vent in respective lateral sides of the rear end, and a third seat plate vent proximate the front nose; and a covering member having three covering member vents extending therethrough and each having a corresponding covering member aeration grid inserted therein, the covering member being mountable to the upper face of the seat plate in a single predetermined position relative thereto in which the three seat plate vents are in register with the three covering member vents and continuous aeration paths are provided through the ventilated saddle by air-flow communication of the seat plate aeration grids with corresponding ones of the covering member aeration grids.

BRIEF DESCRIPTION OF THE DRAWINGS

FIG. 7 is a perspective view, exploded, of a saddle including aeration vents in accordance with another embodiment of the invention, wherein the aeration vents includes a honeycomb aeration grid therein.

It will be noted that throughout the appended drawings, like features are identified by like reference numerals.

DETAILED DESCRIPTION

Figure 1:
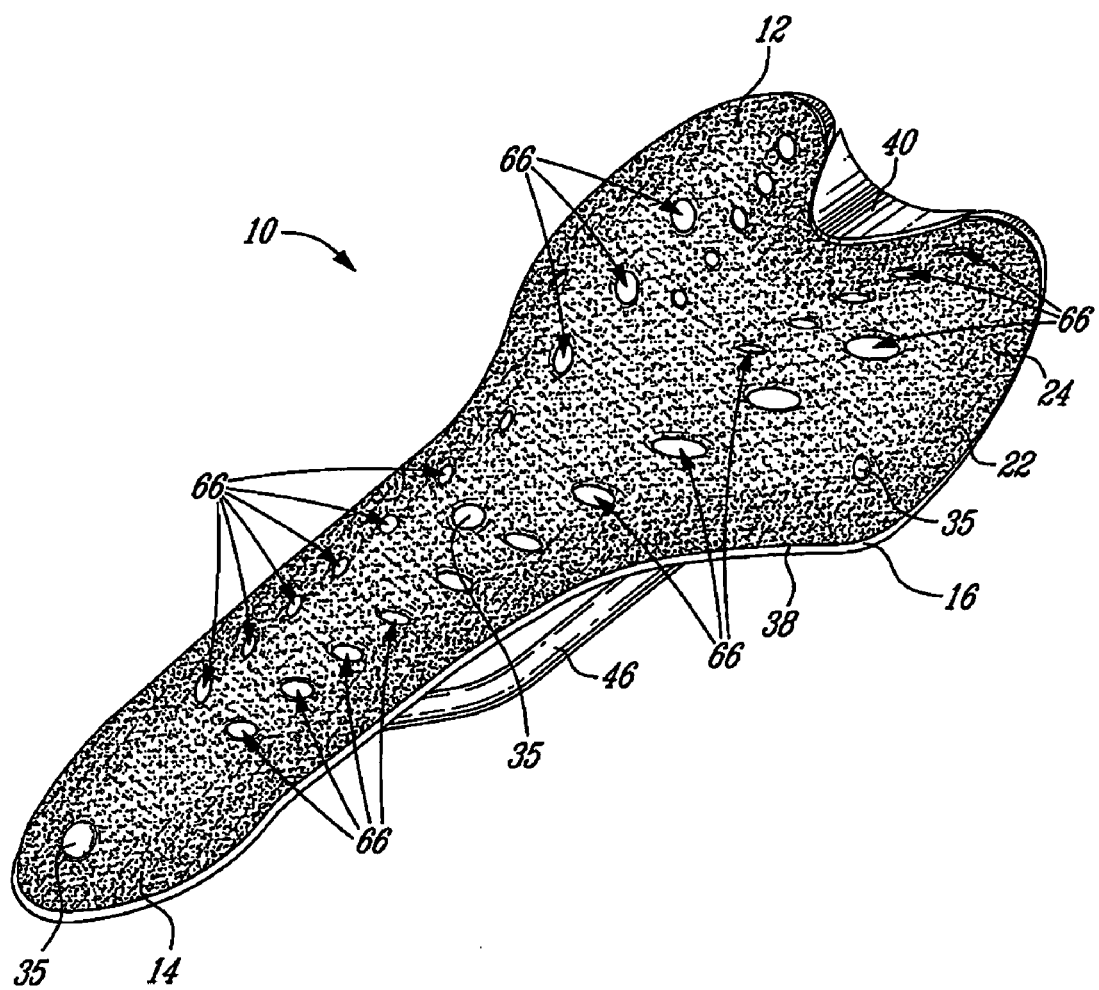
FIG. 1 is a perspective view of a saddle including aeration vents therein in accordance with an embodiment of the invention.

Referring to the drawings and, more particularly, referring to FIG. 1, there is shown a saddle 10 having a somewhat elongated pear shape with a relatively wide rear end portion 12 (or cante) that tapers to a relatively narrow front nose 14. The rear end portion 12 supports the rider's buttocks and the front nose 14 extends through the rider's crotch.

Figure 2:
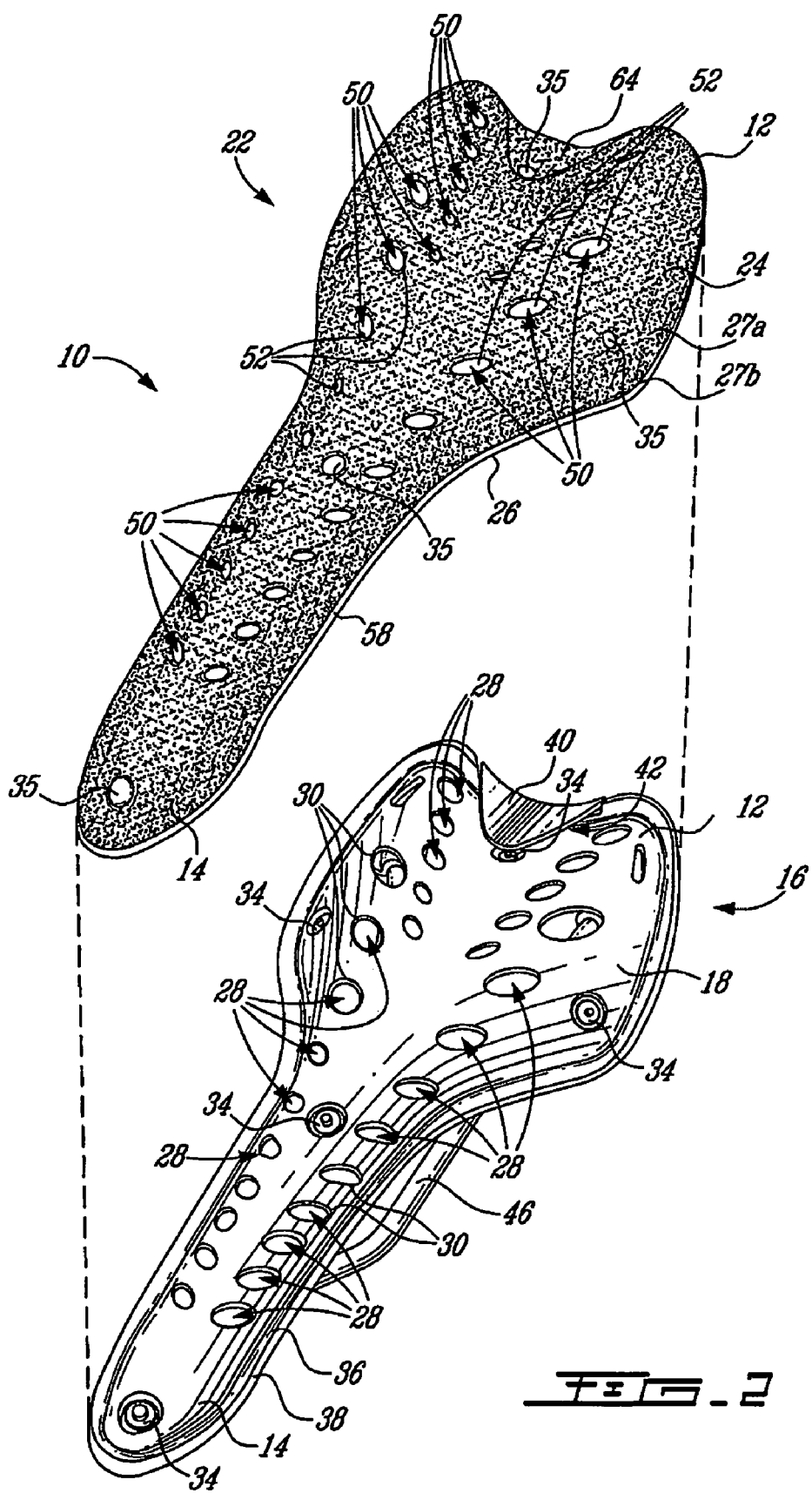
FIG. 2 is a perspective view of the saddle shown in FIG. 1, wherein the covering member and the base plate are disassembled.

Referring to FIG. 2, it will be seen that the saddle 10 includes a rigid or semi-rigid base plate 16, or seat plate, with a top surface 18, or upper face, and a bottom surface 20 (FIG. 3), or lower face, opposed to the top surface 18. The support base 16 can be made of various materials including, but not limited to thermoplastic resin, titanium, aluminum or any other light weight, but sturdy material.

A covering member 22 is mounted atop of the base plate 16. The rider sits on the covering member 22. The covering member 22 has an exposed top surface 24, or upper face, and a bottom surface 26, or lower face, juxtaposed to the top surface 18 of the base plate 16. The covering member 22 can be made with any suitable material known by those skilled in the art, including but not limited to fabric, animal skin or a material which limits the cyclist's perspiration. The covering member 22 can be made of a plurality of material layers laminated onto one another. In the embodiment shown, the covering member 22 is made of two layers 27a, 27b, each being made of a different material.

Figure 3:
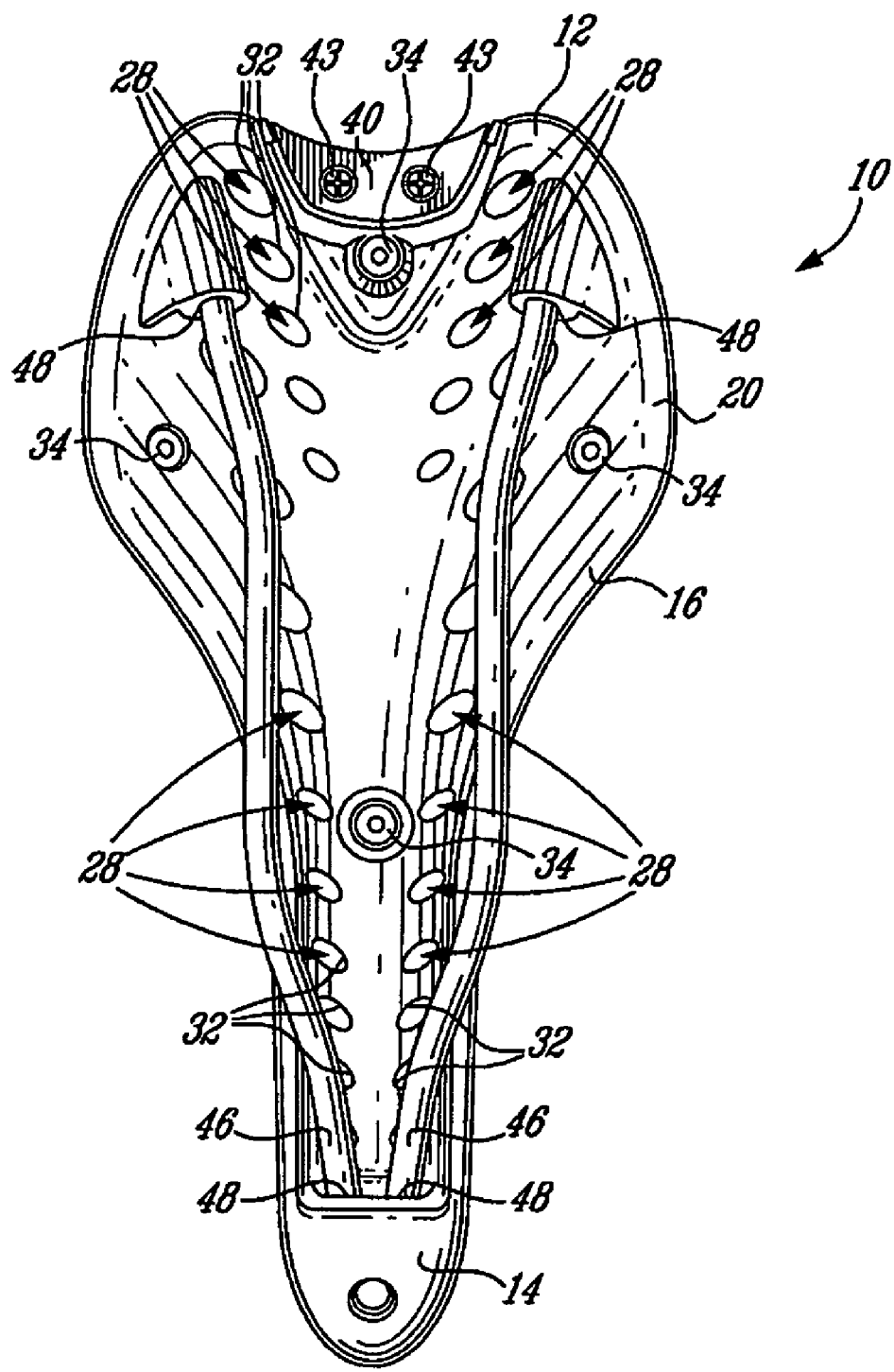
FIG. 3 is a bottom plan view of the saddle shown in FIG. 1.

Referring now to FIGS. 2 and 3 simultaneously, it will be seen that the base plate 16, or shell member, has a plurality of aeration vents 28, apertures or openings, with a top port 30 (FIG. 2) on the top surface 18 of the base plate 16 and a bottom port 32 (FIG. 3) on the bottom surface 18 of the base plate 16. In the embodiment shown, the aeration vents 28 have an elliptical shape and are disposed in longitudinal arrays along the saddle 10. However, it will be appreciated that the shape of the aeration vents 28 and their disposition along the saddle 10 can differ from the ones shown in FIGS. 2 and 3.

The base plate 16 also includes several male members 34 of snap fasteners. The fastening portion of the male members 34 extends upwardly from the top surface 18 of the base plate 16. Each male member 34 is designed to engage a corresponding female member 35 provided on the covering member 22, as it will be described in more details below.

The top surface 18 of the base plate 16 also has a peripheral groove 36 extending along the periphery of the saddle 10 and an upwardly extending rim 38 disposed outwardly of the peripheral groove 36. The peripheral groove 36 and the upwardly extending rim 38 act as localization aids for facilitating the juxtaposition of the base plate 16 and the covering member 22, as it will be described in more details below.

A rear mounting lip 40 extends over the top surface 18 of the base plate 16. An insertion spacing 42, wide enough to receive a portion of the covering member 22, is defined between the rear mounting lip 40 and the base plate 16. The rear mounting lip 40 is mounted to the bottom surface 20 of the base plate with two screws 43. A person skilled in the art will appreciate that the rear mounting lip 40 and the base plate 16 could be of unitary construction. Alternatively, the rear mounting lip 40 could be mounted to the base plate 16 with other types of mechanical fasteners. In the embodiment shown, one male member 34 of the snap fasteners protrudes from the base plate 16 upwardly into the insertion spacing 42. As it will be described in more details below, the male member 34, located in the insertion spacing 42, is adapted to engage a corresponding female member 35 of the covering member 22 when juxtaposed thereto.

The bottom surface 20 of the base plate 16 can include a saddle undercarriage for attaching the saddle 10 to a seat post (not shown), such as a bicycle seat post. In the embodiment shown in FIG. 3, the saddle under carriage includes two spaced-apart mounting rails 46 of a type well-known by those skilled in the art. The mounting rails 46 are inserted at opposed ends thereof into receiving cavities 48 provided in the bottom surface 20 of the base plate 16.

Figure 4:
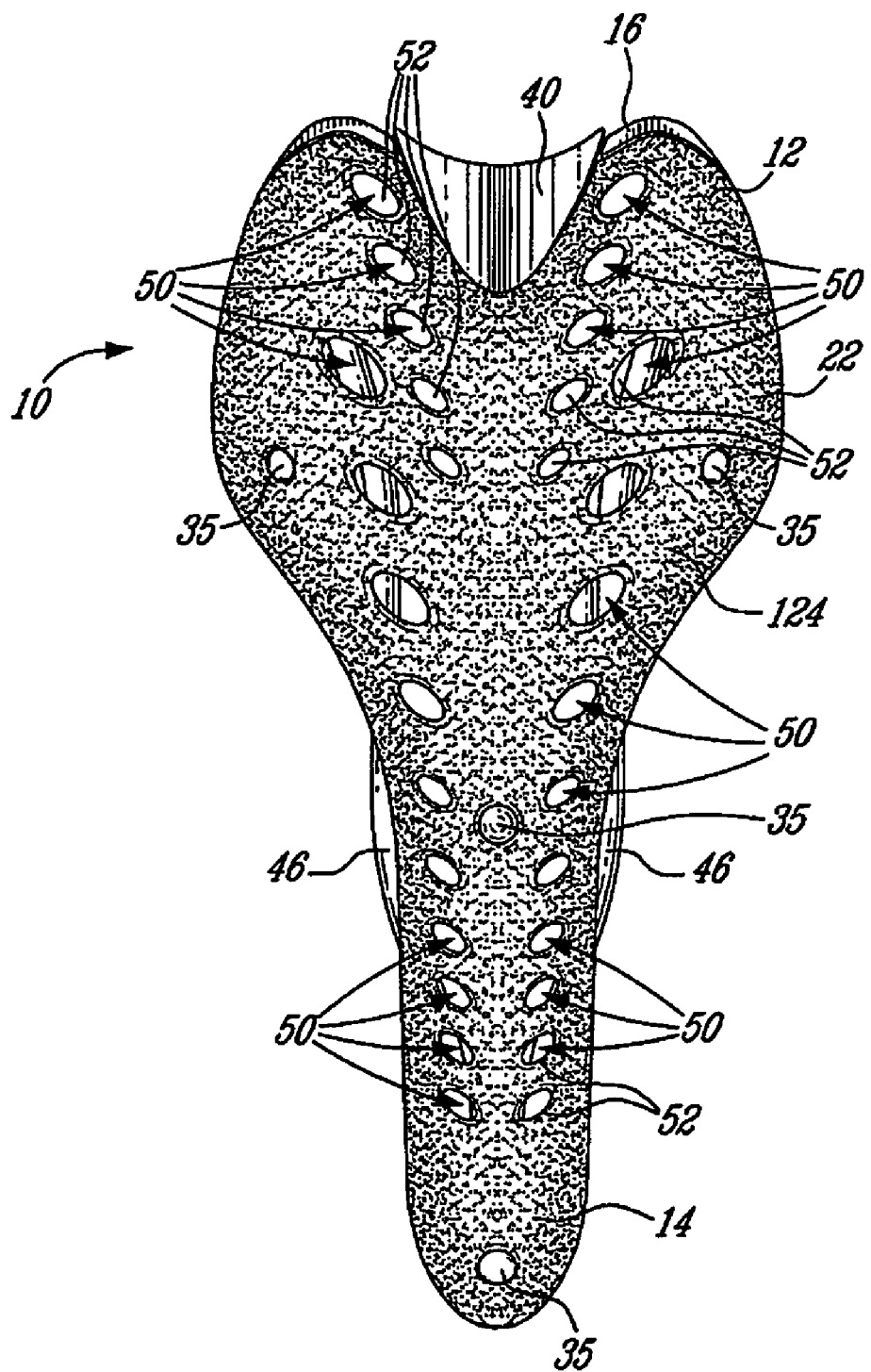
FIG. 4 is a top plan view of the saddle shown in FIG. 1.

Referring now to FIGS. 2 and 4 simultaneously, it will be seen that the covering member 22 also has a plurality of elliptical aeration vents 50 with a top port 52 on the top surface 24 of the covering member 22 and a bottom port (not shown) on the bottom surface 26 of the covering member 22. As for the base plate 16, the aeration vents 50 are disposed in longitudinal arrays along the covering member 22. As it will be explained in more details below, the disposition of the aeration vents 50 on the covering member 22 corresponds to the disposition of the aeration vents 28 on the base plate 16.

As mentioned above, the covering member 22 also includes several female members 35 of snap fasteners. The fastening portion of each female member 35 extends downwardly from the bottom surface 26 of the covering member 22. Each female member 35 is designed to receive a corresponding one of the male members 34 provided on the base plate 16. The position of the female members 35 on the covering member 22 corresponds to the position of the male members 34 on the base plate 16 for engaging into one another when juxtaposing the covering member 22 over the base plate 16, as it will be described in more details below.

The covering member 22 also includes a rear central area 64 insertable in the insertion spacing 42 defined between the base plate 16 and the rear mounting lip 40. In the embodiment shown, the rear central area 64 is thinner than the remaining portion of the covering member 22 to permit easy insertion into spacing 42. However, a person skilled in the art will appreciate that the covering member 22 could be of uniform thickness. The rear central area 64 has one female member 35 for engaging a corresponding one male member 34 protruding upwardly in the insertion spacing 40 when juxtaposing the covering member 22 over the base plate 16, as it will be described in more details below. In the embodiment shown, the rear mounting lip is deflectable for facilitating the engagement of the male member 34 with the corresponding female member 35 positioned in the spacing 42.

For assembling the saddle 10, the covering member 22 is juxtaposed over the base plate 16 with the bottom surface 26 of the covering member 22 lying over the top surface 18 of the base plate 16. The male members 34 and the female members 35 of the snap fasteners are in register to engage into one another for securing the covering member 22 and the base plate 16 together.

The covering member 22 has a peripheral edge 58 which circumscribes the surface area of the covering member 22. The surface area of the covering member 22 is smaller than the surface area of the base plate 16 in a manner such that, when the bottom surface 26 of the covering member 22 lies over the top surface 18 of the base plate 16, the peripheral edge 58 is inserted in the peripheral groove 36, juxtaposed inwardly to the upwardly extending rim 38. The insertion of the peripheral edge 58 of the covering member 22 into the peripheral groove 36 facilitates the juxtaposition of the covering member 22 and the base plate 16 in the predetermined position. In the embodiment shown, the covering member 22 is the counterpart of the depression in the base plate 16.

When the covering member 22 and the base plate 16 are juxtaposed, the aeration vents 28 of the base plate 16 and the aeration vents 50 of the covering member 22 are in register. In the embodiment shown, the outline of the aeration vents 28 is aligned with the outline of the aeration vents 50. Together, they define continuous aeration passages 66, or paths, between the bottom surface 20 of the base plate 16 and the top surface 24 of the covering member 22. The continuous aeration passages 66 have a bottom port 32 on the bottom surface 20 of the base plate 16, i.e. the bottom port 32 of the aeration vents 28 of the base plate 16, and a top port 52 on the top surface 24 of the covering member 22, i.e. the top port 52 of the aeration vents 50 of the covering member 22.

The warm air and the moisture generated by the rider's buttocks and inner thighs can escape freely through the aeration passages 66 provided in the saddle 10. Moreover, fresh air intake can reach the rider's buttocks and inner thighs juxtaposed to the saddle 10 through the aeration passages 66 (FIG. 1). Therefore, the comfort of the rider provided by an increased ventilation is improved without reducing the cushioning comfort offered by the saddle 10.

The width of the aeration vents 28, 50 and the resulting aeration passages 66 can vary according to the rider's comfort needs, but can range from approximately 1 to 15 mm, preferably about 1 to 10 mm, and more preferably about 2 to 5 mm. The size of the aeration vents for a particular saddle can be the same or they may vary depending on their position on the saddle 10.

Also, an intermediate layer (not shown), such as an elastomer padding layer, can be inserted between the base plate 16 and the covering member 22. In such embodiment, the intermediate layer also includes aeration vents which are in register with the aerations vents 28, 50 of the base plate 16 and the covering member 22 when inserted between the juxtaposition of the base plate 16 and the covering member 22 to provide the continuous aeration vents 66 between the bottom and the top surfaces 20, 24 of the saddle 10. A person skilled in the art will appreciate that any number of intermediate layers with aeration vents in register with the aerations vents 28, 50 of the base plate 16 and the covering member 22 can be inserted between the base plate 16 and the covering member 22.

In the embodiment described above, the base plate 16 includes the peripheral groove 36 and the upwardly extending rim 38 to facilitate the juxtaposition of the covering member 22 over the base plate 16 with the aeration vents 28, 50 in register. However, a person skilled in the art will appreciate that other guides or localization aids can be used to align the covering member 22 over the base plate 16 with the aeration vents 28, 50 in register to define continuous air passages 66. For example, without being limitative, if the outline of the aeration vents 28, 50 are aligned in the single predetermined position, the outline of the aeration vents 28, 50 are localization aids for assembling the covering member 22 over the base plate 16 in the single predetermined position. The fasteners having a male member and a corresponding female member on one of the covering member 22 and the base plate 16 are also localization aids for assembling the covering member 22 over the base plate 16 in the single predetermined position. If the center of the aeration vents 28, 50 are aligned in the single predetermined position, the center of the aeration vents 28, 50 are localization aids for assembling the covering member 22 over the base plate 16 in the single predetermined position.

In the embodiment described above, snap fasteners are used for assembling the base plate 16 and the covering member 22. However, a person skilled in the art will appreciate that they can be replaced by, without being limitative, Velcro™, adhesive, magnets, and other types of mechanic fasteners.

Figure 5:
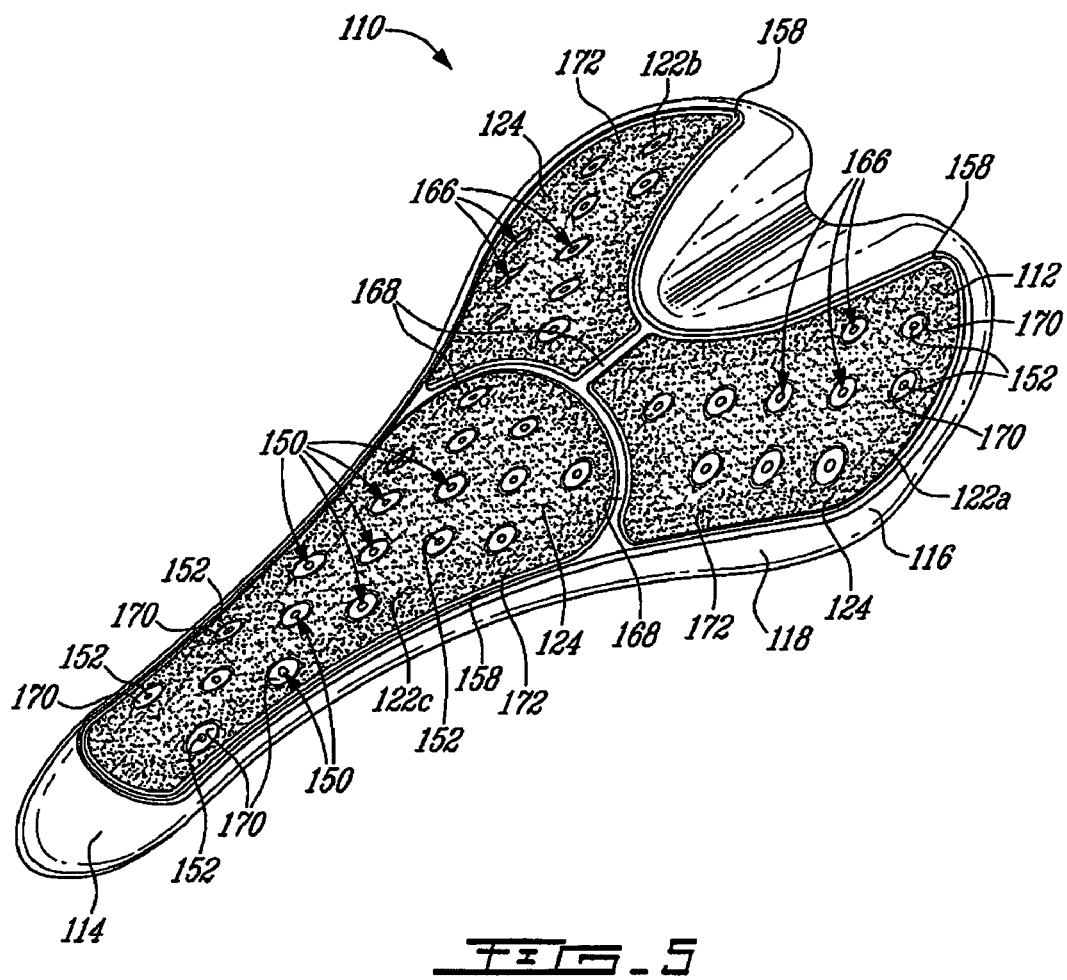
FIG. 5 is a perspective view of a saddle including aeration vents therein in accordance with another embodiment of the invention.

Referring to FIG. 5, it will be seen another embodiment of the saddle 10 wherein the features are numbered with reference numerals in the 100 series which correspond to the reference numerals of the previous embodiment.

The saddle 110 shown in FIG. 5 includes a base plate 116 with a top surface 118 on which three spaced-apart covering members 122a, 122b, 122c are mounted. Each one of the covering members 122a, 122b, 122c has a top surface 124, a bottom surface (not shown), and a peripheral edge 158.

The covering members 122a, 122b, 122c can be inserted in a depression on the top surface 118 of the base plate 116 or they can protrude from the top surface 118. The top surface 118 can include a single depression in which all the covering members 122a, 122b, 122c are inserted or each covering member 122a, 122b, 122c can be inserted in a distinct depression. Ventilation paths 168 are defined on the top surface 124 of the saddle 10 between the covering members 122a, 122b, 122c.

As for the previous embodiment, both the base plate 116 and the covering members 122a, 122b, 122c include a plurality of aeration vents (only the aeration vents 150 of the covering members 122a, 122b, 122c are shown). When the covering members 122a, 122b, 122c are mounted to the base plate 116, the aeration vents 150 of the covering members 122a, 122b, 122c are in register with the aeration vents of the base plate 116. Therefore, continuous aeration vents 166 are defined between the top surface 124 of the covering member 122a, 122b, 122c and the bottom surface (not shown) of the base plate 116. Each aeration vent 166 provides a ventilation channel between the rider's buttocks and inner thighs juxtaposed to the top surface 124 and the bottom surface (not shown) of the saddle 110.

Recess sections 170 surround the top ports 152 of the aeration vents 166. The recess sections 170 are contiguous to the main section 172 of the covering members 122a, 122b, 122c and are thinner than the latter. The top ports 152 are resultantly seated at a substantially planar base of the covering members 122a, 122b, 122c, such that the top ports 152 are surrounded by a portion of the reduced thickness part of the covering members 122a, 122b, 122c which forms the recess sections 170. The top ports 152 are inset into the covering members 122a, 122b, 122c.

The recessed feature of the top ports 152 serves to prevent blockage thereof during use of the saddle 110. As noted above, a particular recess section 170 is larger in area than the corresponding top ports 152. Thus, due to the larger size of the recess section 170, the cyclists body may contact a portion of one of the recess section 170 while another portion of the same recess section 170 remains open, thus providing a direct pathway to the corresponding aeration vent 166 for ventilation. Even if, during use of the saddle 110, the rider fully contacts and entirely covers a recess section 170, the corresponding aeration vent 166 can remain open and capable of allowing ventilation.

The recess sections 170 can be thermoformed, i.e. they are formed by permanently compressing the covering members 122a, 122b, 122c to obtain the desired reduced thickness thereof. The compression is achieved by heat treatment or, more preferably, by a high frequency fusion treatment. The aeration vents 150 can then be cut or die punched through the reduced thickness portion of the covering members 122a, 122b, 122c at the recess section 170. A person skilled in the art will appreciate that other manufacturing techniques can be used.

The same thermoforming technology can be used for providing the rear central area 64 (FIGS. 24), thinner than the remaining portion of the covering member 22 and insertable in the insertion spacing 42 defined between the base plate 16 and the rear mounting lip 40.

The top surface 24, 124 of the covering member 22, 122 can also be provided with a plurality of recessed moisture escape channels (not shown), each moisture escape channel opening on a first end on an edge of an aeration port 52, 152 and on a second end either on the peripheral edge 58, 158 of the covering member 22, 122 or on an edge of another aeration port 52, 152. The recessed moisture escape channels provide a fluid communication between the aeration apertures 66, 166 and the exterior of the saddle 10, 110 over its top surface 24, 124. The moisture escape channels, or recessed insets, facilitate the fluid exchanges between the rider's buttocks and inner thighs and the exterior of the saddle 10, 110.

In the embodiment shown in FIGS. 14, there is shown that the covering member 22 is removably mounted to the base seat 16. A removably mounted covering member 22 allows the rider to mount different covering members to the base seat 16 depending on, amongst others, the weather and its riding circuit. For example, if the weather is cold, he might desire to reduce the ventilation of its saddle by selecting a covering member with less aeration vents 50, covering some aeration vents 28 of the base seat 16. If he is going for a circuit with bumpy roads, he may choose a covering member with improved cushioning properties while keeping the good aeration properties of the saddle. As shown in FIG. 5, a person skilled in the art will appreciate that the covering member 22 can be permanently mounted to the base seat 16.

Figure 6:
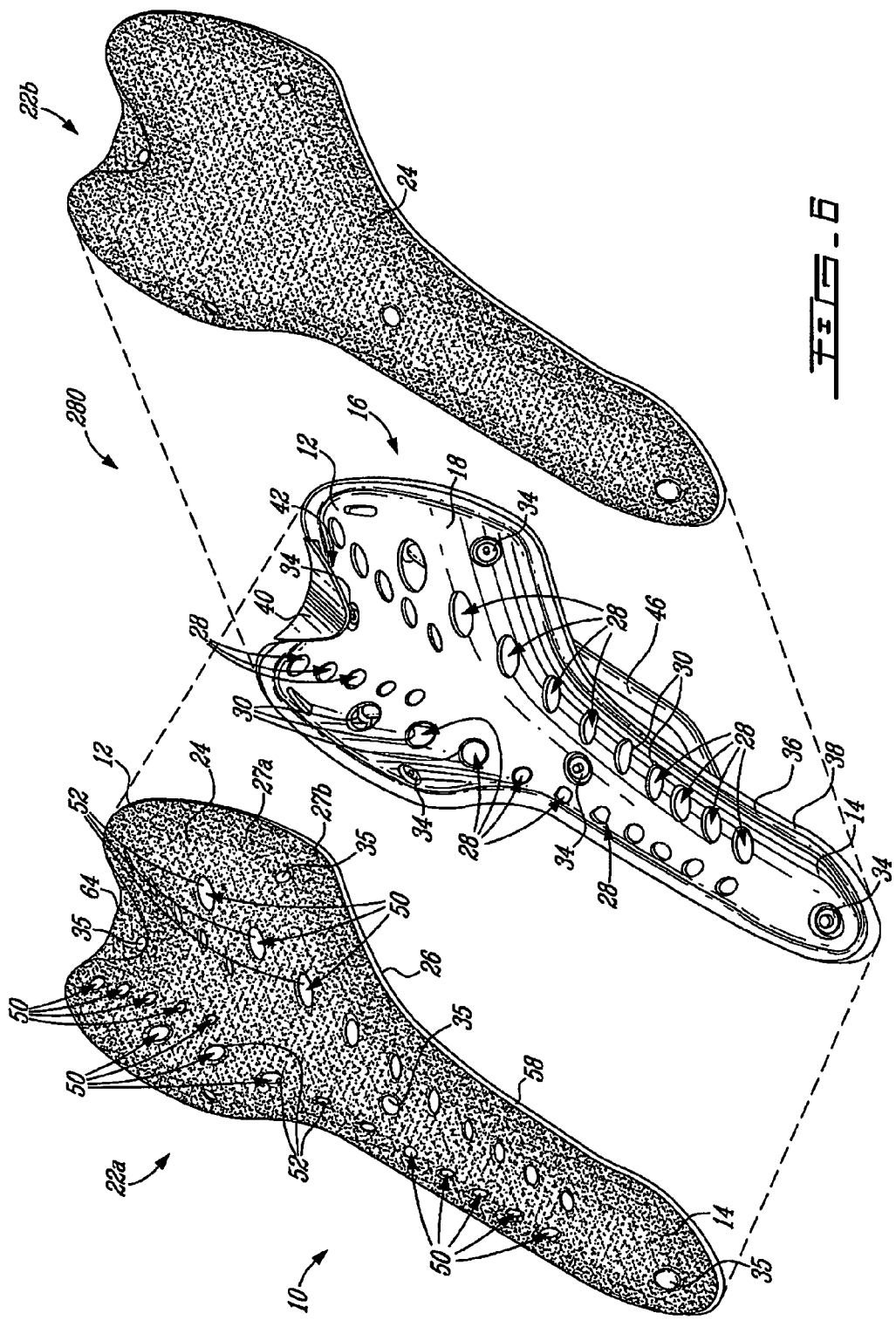
FIG. 6 is a perspective view of a saddle kit, including a base plate and two covering members.

Referring now to FIG. 6, there is shown that the saddle 10 can be provided in the form of a kit 280 including a base plate 16 and two covering members 22a, 22b adapted to be selectively mounted to the base plate 16. The first covering member 22a is similar to the one described above in reference to FIGS. 14. It includes aeration vents 50 which, when the covering member 22a is mounted to the base plate 16, are in register with the aeration vents 28 of the base plate 16 to provide continuous aeration vents 66 in the saddle 10. The second covering member 22b is free of aeration vents 50. Therefore, when mounted to the base plate 16, it covers the aeration vents 28 of the base plate 16, substantially preventing the aeration of the rider's inner thighs and buttocks. The rider can selectively mount the first or the second covering members 22a, 22b to the base plate 16 in accordance with the weather and/or the ventilation needs. As mentioned above, in warmer weather conditions, he can mount the first covering member 22a to the base plate 16 to provide ventilation between the bottom surface 20 and the top surface 24 of the saddle 10. On the opposite, in colder weather conditions, he can mount the second covering member 22b to the base plate 16 to reduce ventilation between the bottom surface 20 and the top surface 24 of the saddle 10.

Referring to FIG. 7, it will be seen another embodiment of the saddle 10, 110 wherein the features are numbered with reference numerals in the 200 series which correspond to the reference numerals of the previous embodiments.

As the saddles 10, 110, the saddle 210 has a somewhat elongated pear shape with a rear end portion 212 that tapers to a front nose 214. It includes a base plate 216, or seat plate, with a top surface 218, or upper face, and a bottom surface (not shown), opposed to the top surface 218. The base plate 216, or shell member, has a plurality of aeration vents 228a, 228b, 228c, apertures or openings, with a top port 230 on the top surface 218 of the base plate 216 and a bottom port (not shown) on the bottom surface of the base plate 216. In the embodiment shown, the base plate 216 includes three aeration vents 228, two 228a, 228b in the rear end portion 212 and one 228c proximate to the front nose 214.

The top surface 218 of the base plate 216 has a peripheral groove 236 extending along the periphery of the saddle 210 and an upwardly extending rim 238 disposed outwardly of the peripheral groove 236. The peripheral groove 236 and the upwardly extending rim 238 act as localization aids for facilitating the juxtaposition of the base plate 216 and a covering member 222, as it will be described in more details below. The base plate 216 includes two spaced-apart mounting rails 246 (only one is shown) for securing the saddle 210 to a seat post (not shown).

Honeycomb aeration grids 290a, 290b, 290c are inserted in the aeration vents 228a, 228b, 228c of the base plate 216. The honeycomb aeration grids 290a, 290b, 290c define apertures 292 therein with ports respectively on the top surface 218 and bottom surface of the base plate 216. Fluids can flow freely in the apertures 292 of the honeycomb aeration grids 290a, 290b, 290c, inserted in the aeration vents 228a, 228b, 228c.

The covering member 222 is mountable atop of the base plate 216. The covering member 222 has an exposed top surface 224, or upper face, and a bottom surface (not shown), or lower face, juxtaposed to the top surface 218 of the base plate 216. The covering member 222 also has three aeration vents 250a, 250b, 250c with a top port 252 on the top surface 224 of the covering member 222 and a bottom port (not shown) on the bottom surface of the covering member 222. As for the base plate 216, two aeration vents 250a, 250b are located in the rear end portion 212 and one aeration vent 250c is proximate to the front nose 214. The disposition of the aeration vents 250a, 250b, 250c on the covering member 222 corresponds to the disposition of the aeration vents 228a, 228b, 228c on the base plate 216.

As for the base plate 216, honeycomb aeration grids 294a, 294b, 294c are inserted in the aeration vents 250a, 250b, 250c of the covering member 222. The honeycomb aeration grids 294a, 294b, 294c define apertures 296 therein with ports respectively on the top surface 222 and bottom surface of the covering member 222. Fluids can flow freely in the apertures 296 of the honeycomb aeration grids 294a, 294b, 294c, inserted in the aeration vents 250a, 250b, 250c.

The covering member 222 has a peripheral edge 258 which circumscribes the surface area of the covering member 222. The surface area of the covering member 222 is smaller than the surface area of the base plate 216 in a manner such that, when the bottom surface of the covering member 222 lies over the top surface 218 of the base plate 216, the peripheral edge 258 is inserted in the peripheral groove 236, juxtaposed inwardly to the upwardly extending rim 238. The insertion of the peripheral edge 258 of the covering member 222 into the peripheral groove 236 facilitates the juxtaposition of the covering member 222 and the base plate 216 in the predetermined position. In the embodiment shown, the covering member 222 is the counterpart of the depression in the base plate 216.

Therefore, for assembling the saddle 210, the covering member 222 is juxtaposed over the base plate 216 with the bottom surface of the covering member 222 lying over the top surface 218 of the base plate 216 and the peripheral edge 258 being inserted in the peripheral groove 236.

It will be appreciated that the base plate 216 and the covering member 222 can include several male and female members 34, designed to be engaged into one another, for securing the covering member 222 to the base plate 216. Other fasteners can also be used. Moreover, the covering member 222 can be permanently secured to the base plate 216.

When the covering member 222 and the base plate 216 are juxtaposed, the aeration vents 228a, 228b, 228c of the base plate 216 and the aeration vents 250a, 250b, 250c of the covering member 222 are in register. In the embodiment shown, the outline of the aeration vents 228a, 228b, 228c is aligned with the outline of the aeration vents 250a, 250b, 250c. Together, they define continuous aeration passages, or paths, in the apertures 292, 296 of the honeycomb aeration grids 290a, 290b, 290c, 294a, 294b, 294c, between the bottom surface of the base plate 216 and the top surface 224 of the covering member 222. The continuous aeration passages have a bottom port on the bottom surface of the base plate 216, i.e. the bottom port of the apertures 292, and a top port on the top surface 224 of the covering member 222, i.e. the top port of the apertures 296.

It will be appreciated that the apertures 292, 296 can be in registry with one another. The outline of the apertures 292 can be aligned with the outline of the apertures 296. However, in an alternative embodiment, the apertures 292, 296 can be superposed randomly and still provide continuous aeration passages between the bottom surface of the base plate 216 and the top surface 224 of the covering member 222. Moreover, in an alternative embodiment, only one of the base plate 216 and the covering member 222 can include honeycomb aeration grids 290, 294. Only some of the aeration vents 228, 250 can have honeycomb aeration grids 290, 294 inserted therein. The shape of the aeration vents 228, 250 and the apertures 292, 296 in the honeycomb aeration grids 290, 294 can vary from the one shown in FIG. 7.

The size of the aeration vents 228, 250 and the resulting aeration passages can vary according to the rider's comfort needs, but can range from approximately 1 to 10 cm, and preferably about 2 to 5 cm. The size of the aeration vents for a particular saddle can be the same or they may vary depending on their position on the saddle 210.

The assembly of the base plate 216 and the covering member 222 can be covered with a ventilated outer layer 298 made of a relatively thin mesh material allowing air to flow therethrough. In colder weather, the outer layer 298 can be made of a substantially air-impermeable material. In the embodiment shown in FIG. 7, the outer layer 298 is adapted to cover the to surface 224 of the covering member.

The dimensions, the shape, and the materials of the saddle 10 can be modified to accommodate the specific and distinct needs of comfort that distinct riders, exercises bicycles, road bicycles, mountain bicycles, hybrid bicycles, and other variations known to those skilled in the art.

As shown in the embodiments described above, aeration apertures are provided at the rear end portion 12, 112 (or cantle) of the saddle 10, 110, under the rider's buttocks, and on each lateral side of the front nose 14, under the riders inner thighs. Therefore, the aeration apertures 66 provide moisture escape outlets and fresh air intake ports for the cyclist's buttocks and inner thighs juxtaposed to the saddle 10.

In some embodiments, ventilation is possible through at least 15% of the surface area of the saddle, in other embodiments, ventilation is possible through at least 50% of the surface area of the saddle 10 for better cooling and comfort. The amount of ventilation can be varied by changing at least one of the number of aeration vents 66 and the surface area of aeration vents 66. The disposition of the aeration vents 66 can be varied to allow more ventilation in some regions or less ventilation in others.

The saddle provides maximum comfort to the rider while firmly supporting the weight of the rider. The free flow of air resulting from the aeration vent 66 provides a cooling effect on the rider's buttocks, inner thighs, and/or groin area, thus making the saddle 10 more comfortable to the rider while the user is in motion.

A person skilled in the art will appreciate that the saddle 10, 110 can be made in one-piece or in multiple pieces. For example, the base plate 16, 116 can be made of two distinct pieces, each having one or more covering member 22, 122 mounted to their top surfaces 18, 118.

The embodiments of the invention described above are intended to be exemplary only. For example, the aeration apertures 66, 166 can be disposed regularly across the surface of the saddle 10, 110. Alternatively, the aeration apertures 66, 166 can be disposed randomly or in predetermined concentrated groupings across the saddle 10, 110. The scope of the invention is therefore intended to be limited solely by the scope of the appended claims.

The invention claimed is:

1. A ventilated saddle comprising:
   a seat plate having a rear end and a front nose, an upper face, and three seat plate vents extending therethrough and each receiving a corresponding seat plate aeration grid, including a first seat plate vent and a second seat plate vent in respective lateral sides of the rear end, and a third seat plate vent proximate the front nose;
   a covering member having three covering member vents extending therethrough and each having a corresponding covering member aeration grid inserted therein, the covering member being mountable to the upper face of the seat plate in a single predetermined position relative thereto in which the three seat plate vents are in register with the three covering member vents and continuous aeration paths are provided through the ventilated saddle by air-flow communication of the seat plate aeration grids with corresponding ones of the covering member aeration grids.

2. A ventilated saddle as claimed in claim 1, wherein at least one localization aid is provided between the seat plate and the covering member for juxtaposing the covering member to the upper face of the seat plate in the single predetermined position.

3. A ventilated saddle as claimed in claim 2, wherein the localization aid comprises a depression in the upper face of the seat plate.

4. A ventilated saddle as claimed in claim 2, wherein the at least one localization aid comprises at least one first fastening member associated with the seat plate and at least one second fastening member associated with the covering member, the at least one first fastening member and the at least one second fastening member being engageable into one another for mounting the covering member to the seat plate in the single predetermined position.

5. A ventilated saddle as claimed in claim 1, wherein the covering member is a counterpart of the upper face of the seat plate.

6. A ventilated saddle as claimed in claim 1, comprising fasteners for mounting the covering member to the upper face of the seat plate.

7. A ventilated saddle as claimed in claim 1, wherein the seat plate vents have an outline and the covering member vents have an outline aligned with the outline of the seat plate vents in the single predetermined position.

8. A ventilated saddle as claimed in claim 1, wherein the seat plate and the covering member have the same vent pattern.

* * * * *